(12) United States Patent
Lee et al.

(10) Patent No.: US 10,261,639 B2
(45) Date of Patent: Apr. 16, 2019

(54) TOUCH DISPLAY DEVICE AND METHOD OF MANUFACTURING THE SAME

(71) Applicant: Samsung Display Co., Ltd., Yongin-si (KR)

(72) Inventors: Won-Il Lee, Cheonan-si (KR); Youn-Hwan Jung, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 79 days.

(21) Appl. No.: 15/146,247

(22) Filed: May 4, 2016

(65) Prior Publication Data

US 2017/0115758 A1    Apr. 27, 2017

(30) Foreign Application Priority Data

Oct. 22, 2015 (KR) ........................ 10-2015-0147076

(51) Int. Cl.
*G06F 3/041* (2006.01)
*G06F 3/044* (2006.01)

(52) U.S. Cl.
CPC .... *G06F 3/044* (2013.01); *G06F 2203/04103* (2013.01); *G06F 2203/04111* (2013.01)

(58) Field of Classification Search
CPC ...................................................... G06F 3/044
See application file for complete search history.

(56) References Cited

U.S. PATENT DOCUMENTS

| | | | |
|---|---|---|---|
| 8,847,213 B2 | 9/2014 | So et al. | |
| 2001/0022632 A1* | 9/2001 | Umemoto | G02F 1/13338 349/12 |
| 2012/0212445 A1* | 8/2012 | Heikkinen | G06F 1/1626 345/174 |
| 2013/0002133 A1* | 1/2013 | Jin | G09F 9/33 313/511 |
| 2014/0132854 A1* | 5/2014 | Wu | G06F 1/169 349/12 |
| 2014/0139758 A1* | 5/2014 | Jian | G06F 3/0412 349/12 |
| 2015/0070312 A1* | 3/2015 | Her | G06F 3/041 345/174 |
| 2015/0234430 A1* | 8/2015 | Gupta | G06F 1/1643 345/174 |
| 2015/0370395 A1* | 12/2015 | Hsu | G06F 3/0412 345/174 |
| 2016/0215175 A1* | 7/2016 | Yoon | G06F 3/041 |
| 2016/0255713 A1* | 9/2016 | Kim | G09F 9/301 361/749 |

FOREIGN PATENT DOCUMENTS

KR    10-2013-0130552    12/2013

* cited by examiner

*Primary Examiner* — Lixi C Simpson
(74) *Attorney, Agent, or Firm* — H.C. Park & Associates, PLC

(57) ABSTRACT

A touch display device includes a touch screen, a display panel, a window member, and an adhesive layer. The display panel is configured to display an image and includes a first curved surface area. The window member is disposed on the display panel and includes a second curved surface area disposed in correspondence with the first curved surface area. The adhesive layer is disposed between the display panel and the touch screen panel and is configured to block light in at least a portion thereof. The display panel is disposed between the window member and the touch screen panel.

14 Claims, 13 Drawing Sheets form the prior art that is
already known to a person of ordinary skill in the art.

TOUCH DISPLAY DEVICE AND METHOD OF MANUFACTURING THE SAME

CROSS-REFERENCE TO RELATED APPLICATION

This application claims priority from and the benefit of Korean Patent Application No. 10-2015-0147076, filed on Oct. 22, 2015, which is hereby incorporated by reference for all purposes as if fully set forth herein.

BACKGROUND

Field

Exemplary embodiments relate to an electronic device, and, more particularly, to a touch display device and a method of manufacturing the same.

Discussion

With the development of an information consuming society has come the emergence of various types of display devices to display information, such as liquid crystal display devices, plasma display panels, field emission display devices, electrophoretic display devices, electrowetting display devices, organic light emitting display devices, etc. Furthermore, display devices may include or be associated with a touch screen panel to provide an intuitive user interface. In other words, a touch screen panel may be utilized as an input device to receive a command input by touching (or almost touching) a screen of a display device using an object, such as a finger, stylus, etc. Given that a touch screen panel can be substitute for a separate input device connected to a display device, such as a keyboard, mouse, etc., touch screens are not only attractive input mechanisms, but can increase the mobility of user electronic devices because separate input mechanisms need not be carried with the user electronic devices.

Conventional touch screen panels may include a resistive overlay touch screen panel, a photosensitive touch screen panel, a capacitive touch screen panel, and the like. Among these touch screen panels, capacitive touch screen panels are configured to convert information of a contact position into an electrical signal by sensing a change in the capacitance formed between a conductive sensing pattern and an adjacent sensing pattern, a ground electrode, or the like, when an object (e.g., a finger, stylus, etc.) comes in contact (or close contact) with the touch screen panel. Furthermore, these touch display devices may include the touch screen panel and a display panel under a window member. In this manner, an optically clear adhesive (OCA) may be used to attach the touch screen panel to the display panel and to attach the window member to the touch screen panel. As such, two sheets of the optically clear adhesive are typically used, and, thus, a thickness of the touch display device may increase. In addition, when the window member includes a curved surface area, metal lines of the touch screen panel may be visually recognizable in the curved surface area. To prevent this problem, metal lines of the touch screen panel may be positioned apart from the display panel, but such an approach may increase the width of a bezel area of a corresponding touch display device.

The above information disclosed in this Background section is only for enhancement of understanding of the background of the inventive concept, and, therefore, it may contain information that does not form the prior art that is already known to a person of ordinary skill in the art.

SUMMARY

One or more exemplary embodiments provide a touch display device configured to decrease the width of a bezel area and to reduce the visibility of metal lines.

One or more exemplary embodiments provide a method of manufacturing a touch display device configured to decrease the width of a bezel area and to reduce the visibility of metal lines.

Additional aspects will be set forth in the detailed description which follows, and, in part, will be apparent from the disclosure, or may be learned by practice of the inventive concept.

According to one or more exemplary embodiments, a touch display device includes a touch screen, a display panel, a window member, and an adhesive layer. The display panel is configured to display an image and includes a first curved surface area. The window member is disposed on the display panel and includes a second curved surface area disposed in correspondence with the first curved surface area. The adhesive layer is disposed between the display panel and the touch screen panel and is configured to block light in at least a portion thereof. The display panel is disposed between the window member and the touch screen panel.

According to one or more exemplary embodiments, a method of manufacturing a touch display device includes: disposing a window member on a display panel configured to display an image, the window member comprising a first curved surface area disposed in correspondence with a second curved surface area of the display panel; disposing an adhesive layer on the display panel, the adhesive layer being configured to block light in at least a portion thereof, and disposing the display panel on a touch screen panel, the adhesive layer being disposed between the display panel and the touch screen panel. The display panel is disposed between the window member and the touch screen panel.

According to one or more exemplary embodiments, a touch display device includes an adhesive layer disposed between a display panel and a touch screen panel with the touch screen panel being disposed under the display panel. The adhesive layer includes a black material to block light. In this manner, metal lines of the touch screen panel may not be visually recognized. Since the adhesive layer blocks light, metal lines of the touch screen panel may be disposed in an active area of the display panel. Accordingly, a width of a bezel of the touch display device may be decreased. In addition, a single optically clear adhesive (OCA) may be disposed between the window member and the display panel to reduce an overall thickness of the touch display device.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
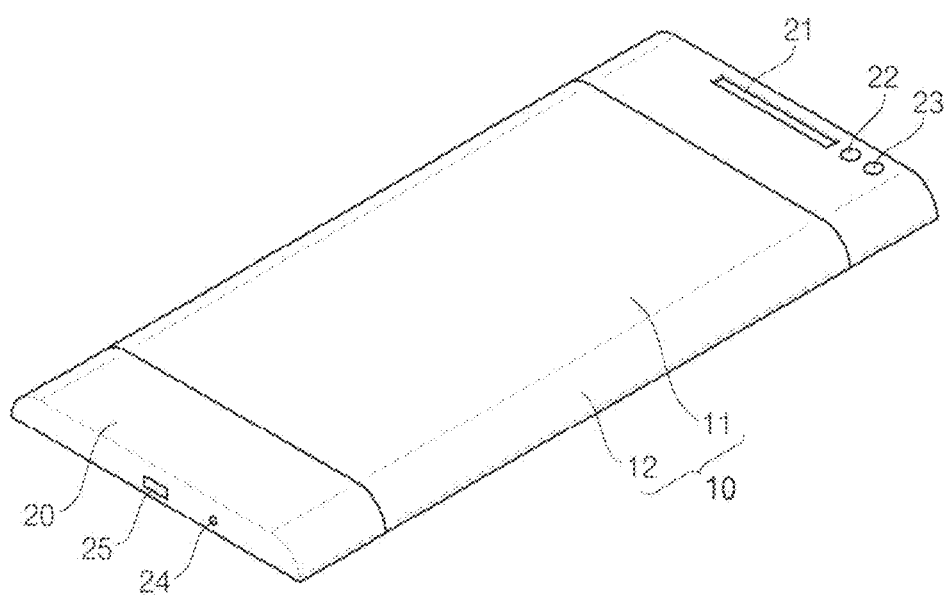
FIG. 1 is a perspective view of a touch display device, according to one or more exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

Unless otherwise specified, the illustrated exemplary embodiments are to be understood as providing exemplary features of varying detail of various exemplary embodiments. Therefore, unless otherwise specified, the features, components, modules, layers, films, panels, regions, and/or aspects of the various illustrations may be otherwise combined, separated, interchanged, and/or rearranged without departing from the disclosed exemplary embodiments. Further, in the accompanying figures, the size and relative sizes of layers, films, panels, regions, etc., may be exaggerated for clarity and descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. Further, the D1-axis, the D2-axis, and the D3-axis (which may cross the D1-axis and D2-axis and extend out of the page) are not limited to three axes of a rectangular coordinate system, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms "first," "second," etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is a perspective view of a touch display device, according to one or more exemplary embodiments.

Referring to FIG. 1, a touch display device includes a display portion 10 including a flat surface area 11 and a curved surface area 12, a body 20 on which the display portion 10 is positioned, and additional components (or devices) provided in (or on) the body 20. The additional devices may include a speaker 21, an illumination sensor 22, a camera module 23, a microphone 24, and a data input/output (I/O) port 25. Although specific reference will be made to this particular implementation, it is also contemplated that the touch display device may embody many forms and include multiple and/or alternative components.

The display portion 10 may be configured to be intentionally bent, rolled, folded, flexed, etc. (hereinafter collectively referred to as being folded or foldable), without being damaged, similar to a piece of paper. For example, the display portion 10 may include a flexible thin substrate. The display portion 10 is coupled to the body 20, which may function to maintain a bent shape of the display portion 10. The display portion 10 may be implemented by a display module, which may be freely folded and unfolded, such as a flexible display. In this manner, a device including the display portion 10 may also be configured to be freely folded and unfolded.

When the display portion 10 employs a plastic substrate rather than a glass substrate, the display portion 10 may be formed using a low temperature manufacturing process rather than a conventional manufacturing process. In this manner, the low temperature manufacturing process may prevent the substrate from being damaged. The display portion 10 may have a foldable and unfoldable flexibility by substituting a glass substrate covering a liquid crystal by a plastic film in a liquid crystal display (LCD), a light emitting diode (LED), an organic LED (OLED), an active matrix OLED (AMOLED), and the like. The display portion 10 may have advantages, such as it may be relatively thin and lightweight, may be relatively robust to impact, may be intentionally foldable and unfoldable, and may be manufactured in various shapes. To this end, the display portion 10 may include a flat surface area 11 and a curved surface area 12, as previously mentioned.

Figure 2:
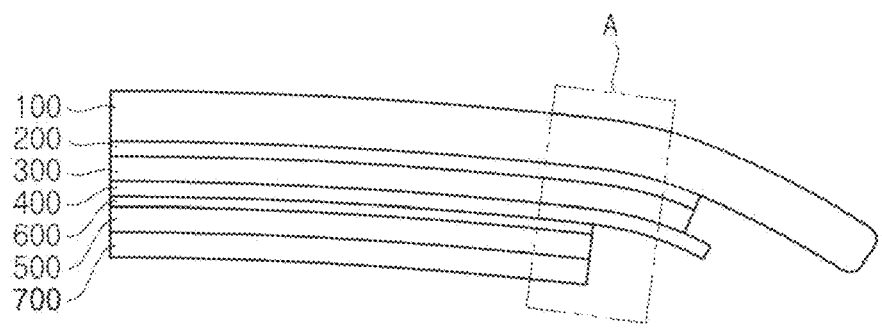
FIG. 2 is a cross-sectional view of a touch display device, according to one or more exemplary embodiments.
Figure 3:
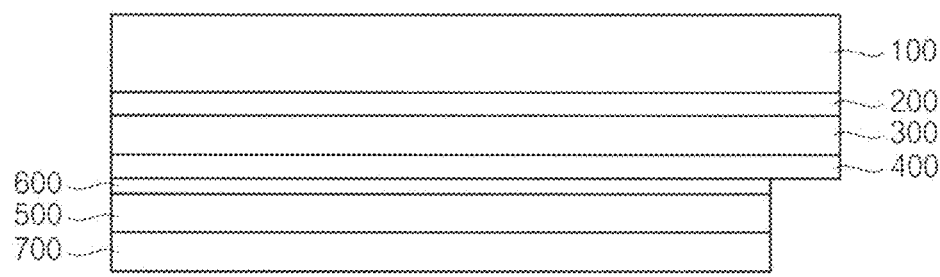
FIG. 3 is an enlarged cross-sectional view of portion "A" in FIG. 2, according to one or more exemplary embodiments.

FIG. 2 is a cross-sectional view of a touch display device, according to one or more exemplary embodiments. FIG. 3 is an enlarged cross-sectional view of portion "A" in FIG. 2, according to one or more exemplary embodiments.

Referring to FIGS. 2 and 3, a touch display device includes a window member 100, an optically clear adhesive (OCA) 200, a polarizing plate 300, a display panel 400, a touch screen panel 500, an adhesive layer 600, and a buffer member (or layer) 700.

The display panel 400 may display an image. The display panel 400 may include a flat surface area and a curved surface area. The flat surface area of the display panel 400 may correspond to the flat surface area 11 shown in FIG. 1, and the curved surface area of the display panel 400 may correspond to the curved surface area 12 shown in FIG. 1. The polarizing plate 300 may be attached (or otherwise coupled) to the display panel 400.

The window member 100 may cover elements of the touch display device other than the window member 100 and protect the elements. The window member 100 may have a flat surface area and a curved surface area. The flat surface area of the window member 100 may correspond to the flat surface area 11 of FIG. 1, and the curved surface area of the window member 100 may corresponds to the curved surface area 12 of FIG. 1. The window member 100 may be assembled with the display panel 400. The window member 100 may be attached to the polarizing plate 300 that is on the display panel 400. The window member 100 may be formed of a transparent (or at least translucent) material. In one or more exemplary embodiments, the window member 100 may include a plurality of base layers attached to each other by an adhesive layer disposed therebetween. The window member 100 may be attached to the polarizing plate 300 by the optically clear adhesive (OCA) 200. In one or more exemplary embodiments, a single optically clear adhesive (OCA) 200 is disposed between the window member 100 and the display panel 400, thereby decreasing a thickness of the touch display device.

The touch screen panel 500 is disposed below the display panel 400. The touch screen panel 500 will be described in more detail with reference to FIGS. 13 to 21.

The adhesive layer 600 is disposed between the display panel 400 and the touch screen panel 500. The adhesive layer 600 is disposed on the touch screen panel 500. The adhesive layer 600 may block light. In one or more exemplary embodiments, the adhesive layer 600 may include a black material, and, thereby, configured to block light. In this manner, metal wirings (or lines) of the touch screen panel 500 may not be visually recognized. The adhesive layer 600 will be described in more detail with reference to FIGS. 4 and 5.

The buffer member 700 may be disposed below the touch screen panel 500. The buffer member 700 may include a material having elasticity. The buffer member 700 may be configured to absorb shock from outside. In this manner, the buffer member 700 may prevent damage to the display panel 400 and the touch screen panel 500.

Figure 4:
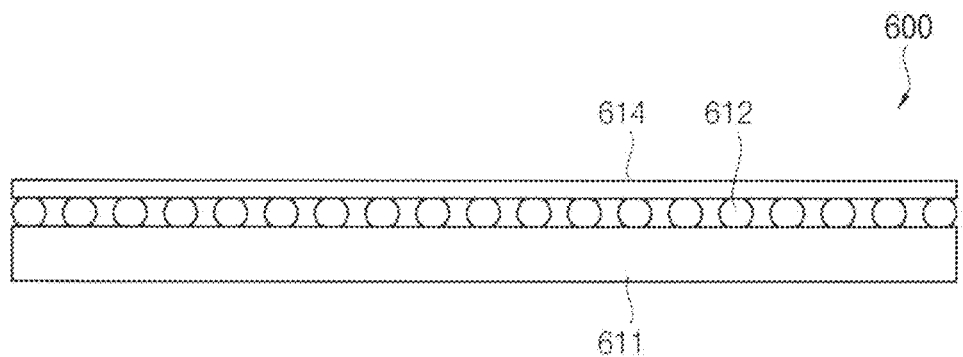
FIG. 4 is a cross-sectional view of an adhesive layer, according to one or more exemplary embodiments.
Figure 5:
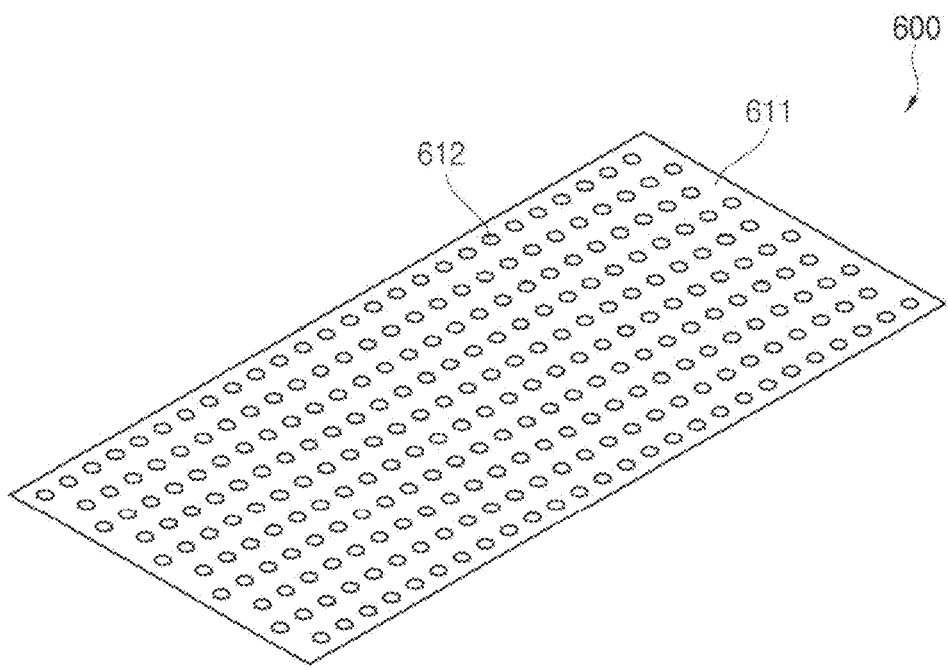
FIG. 5 is a perspective view of an adhesive layer, according to one or more exemplary embodiments.

FIG. 4 is a cross-sectional view of an adhesive layer, according to one or more exemplary embodiments. FIG. 5 is a perspective view of an adhesive layer, according to one or more exemplary embodiments.

Referring to FIGS. 4 and 5, the adhesive layer 600 includes a base film 611, a tackifying layer 612, and a release film 614. In one or more exemplary embodiments, the base film 611 may include polyethylene terephthalate (PET), polyethylene naphthalate (PEN), polyethylene sulfide (PES), and/or polyethylene (PE). In one or more exemplary embodiments, the base film 611 may have a thickness of from about 25 μm to about 300 μm, e.g., about 75 μm to about 250 μm, such as about 125 μm to about 175 μm, for example, about 25 μm to about 50 jam, for instance, about 250 μm to about 300 am. When the thickness of the base film 611 is less than about 25 μm, the base film 611 is relatively very thin, and, as such, may not sufficiently function as a protection film to protect a lower portion of the display panel. When the thickness of the base film 611 is more than about 300 μm, the thickness of the touch display device may be unnecessarily increased or unnecessarily thick.

As a result of a treatment (e.g., a predetermined or previously completed treatment) of the base film 611, a surface thereof may include a hydrophobic region and/or a hydrophilic region. In one or more exemplary embodiments, to form the hydrophobic and/or the hydrophilic regions on a surface of the base film 611, a plasma treatment may be performed; however, exemplary embodiments are not limited thereto and any suitable method may be performed. Also, in one or more exemplary embodiments, the base film 611 may be divided into the hydrophilic region and the hydrophobic region; however, it may be divided into more than two separate regions having different characteristics (e.g., different material characteristics).

A first surface of the base film 611 facing the display panel 400 (shown in FIGS. 3 and 4) may have both the hydrophobic and the hydrophilic regions. The tackifying layer 612 is disposed on the surface of the base film 611 facing the display panel 400. For example, the tackifying layer 612 may be positioned at a region corresponding to the hydrophobic region or the hydrophilic region. The tackifying layer 612 may have a non-continuous shape or arrangement. For example, the tackifying layer 612 may include a plurality of adhesive dots that are separated (e.g., mutually separated or arranged). In one or more exemplary embodiments, each of the plurality of adhesive dots may have a circular cross-sectional shape, and a surface (e.g., a plane or flat surface) of the entire tackifying layer 612 may have an embossed shape or texture. When the plurality of adhesive dots are separated from each other (e.g., spaced apart from each other) and the tackifying layer 612 has the embossed shape or texture, flexibility may be improved compared to when the tackifying layer 612 is formed as a sheet (e.g., a continuous sheet). However, the shape of the plurality of adhesive dots is not limited thereto, and the plurality of adhesive dots (which may be spaced apart from one another and positioned between the base film 611 and the release film 614) may have any suitable shape and/or configuration.

The release film 614 is a protecting film, which may be configured to prevent contamination of and external contact to the tackifying layer 612. The release film 614 may be positioned on the tackifying layer 612 before the protection film is adhered to the display panel, and may be removed before the tackifying layer 612 is attached to the display panel 400.

Figure 6:
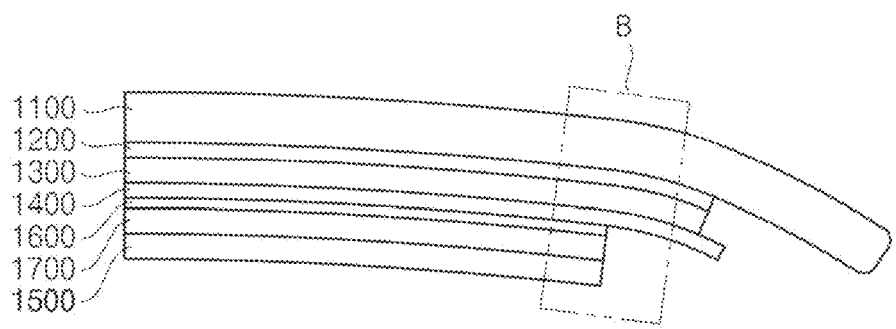
FIG. 6 is a cross-sectional view of a touch display device, according to one or more exemplary embodiments.
Figure 7:
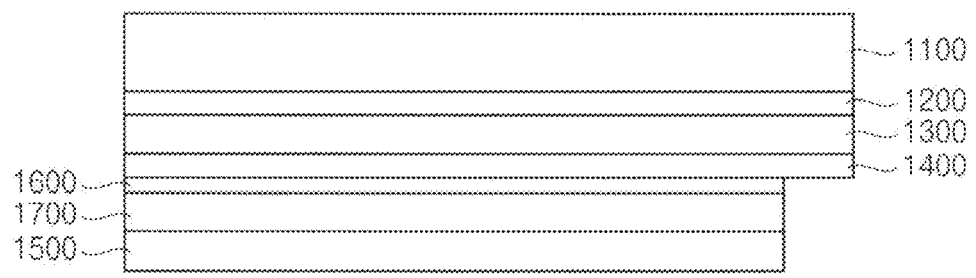
FIG. 7 is an enlarged cross-sectional view of portion "B" in FIG. 6, according to one or more exemplary embodiments.

FIG. 6 is a cross-sectional view of a touch display device, according to one or more exemplary embodiments. FIG. 7 is an enlarged cross-sectional view of portion "B" in FIG. 6, according to one or more exemplary embodiments.

Referring to FIGS. 6 and 7, a touch display device includes a window member 1100, an optically clear adhesive (OCA) 1200, a polarizing plate 1300, a display panel 1400, a touch screen panel 1500, an adhesive layer 1600, and a buffer member 1700.

The display panel 1400 may display an image. The display panel 1400 may include a flat surface area and a curved surface area. The flat surface area of the display panel 400 may correspond to the flat surface area 11 shown in FIG. 1, and the curved surface area of the display panel 400 may correspond to the curved surface area 12 shown in FIG. 1. The polarizing plate 1300 may be attached (or otherwise coupled) to the display panel 1400.

The window member 1100 may cover elements of the touch display device other than the window member 1100 and protect the elements. The window member 1100 may have a flat surface area and a curved surface area. The flat surface area of the window member 1100 may correspond to the flat surface area 11 of FIG. 1, and the curved surface area of the window member 1100 may corresponds to the curved surface area 12 of FIG. 1. The window member 1100 may be assembled with the display panel 1400. The window member 1100 may be attached to the polarizing plate 1300 that is on the display panel 1400. The window member 1100 may be formed of a transparent (or at least translucent) material. In one or more exemplary embodiments, the window member 1100 may include a plurality of base layers attached to each other by an adhesive layer disposed therebetween. The window member 1100 may be attached the polarizing plate 1300 by the optically clear adhesive (OCA) 1200. In one or more exemplary embodiments, a single optically clear adhesive (OCA) 1200 is disposed between the window member 1100 and the display panel 1400, thereby decreasing a thickness of the touch display device.

The touch screen panel 1500 is disposed below the display panel 1400, and may correspond to the touch screen panel 500 of FIGS. 2 and 3. The adhesive layer 1600 is disposed between the display panel 1400 and the touch screen panel 1500. The adhesive layer 1600 may be configured to block light. In one or more exemplary embodiments, the adhesive layer 1600 may include a black material configured to block light. In this manner, metal wirings (or lines) of the touch screen panel 1500 may not be visually recognized. The adhesive layer 1600 may correspond to the adhesive layer 600 of FIGS. 2 through 4.

Furthermore, the buffer member 1700 may be disposed between the adhesive layer 1600 and the touch screen panel 1500. The buffer member 1700 may include a material having elasticity and may be configured to absorb shock from outside. For example, the buffer member 1700 may absorb shocks applied to elements above the buffer member 1700. In this manner, the buffer member 1700 may prevent damage to the display panel 1400.

Figure 8:
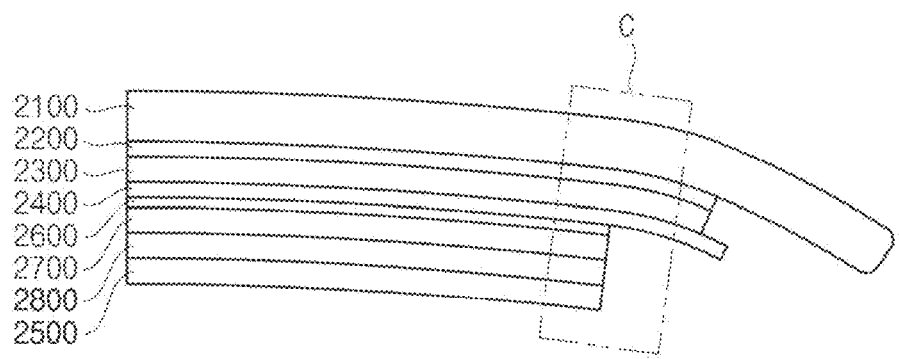
FIG. 8 is a cross-sectional view of a touch display device, according to one or more exemplary embodiments.
Figure 9:
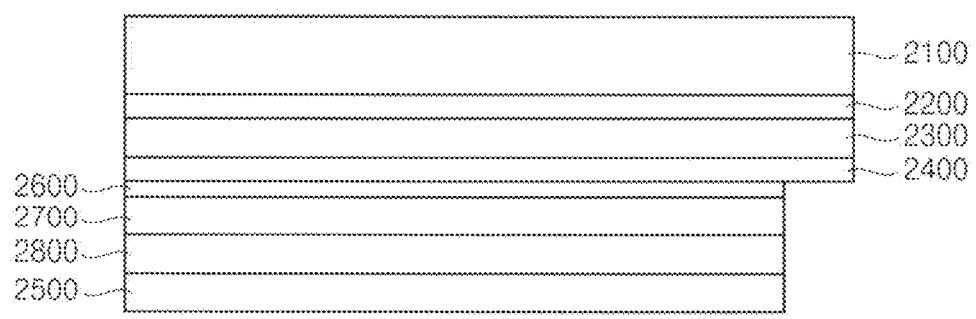
FIG. 9 is an enlarged cross-sectional view of portion "C" in FIG. 8, according to one or more exemplary embodiments.

FIG. 8 is a cross-sectional view of a touch display device, according to one or more exemplary embodiments. FIG. 9 is an enlarged cross-sectional view of portion "C" in FIG. 8, according to one or more exemplary embodiments.

Referring to FIGS. 8 and 9, a touch display device according to an exemplary embodiment includes a window member 2100, an optically clear adhesive (OCA) 2200, a polarizing plate 2300, a display panel 2400, a touch screen panel 2500, an adhesive layer 2600, a buffer member 2700, and a grounding layer 2800.

The display panel 2400 may display an image. The display panel 2400 may include a flat surface area and a curved surface area. For instance, the flat surface area of the display panel 400 may correspond to the flat surface area 11 shown in FIG. 1, and the curved surface area of the display panel 400 may correspond to the curved surface area 12 shown in FIG. 1. The polarizing plate 2300 may be attached to the display panel 2400.

The window member 2100 may cover elements of the touch display device other than the window member 2100 and protect the elements. The window member 2100 may have a flat surface area and a curved surface area. The flat surface area of the window member 2100 may correspond to the flat surface area 11 of FIG. 1, and the curved surface area of the window member 2100 may corresponds to the curved surface area 12 of FIG. 1. The window member 2100 may be assembled with the display panel 2400. The window member 2100 may be attached to the polarizing plate 2300 that is on the display panel 2400. The window member 2100 may be formed of a transparent (or at least translucent) material. In one or more exemplary embodiments, the window member 2100 may include a plurality of base layers attached to each other by an adhesive layer disposed therebetween. The window member 2100 may be attached to the polarizing plate 2300 by the optically clear adhesive (OCA) 2200. In one or more exemplary embodiments, a single optically clear adhesive (OCA) 2200 is disposed between the window member 2100 and the display panel 2400, thereby decreasing a thickness of the touch display device.

The touch screen panel 2500 is disposed below the display panel 2400. The touch screen panel 2500 will be described in more detail with reference to FIGS. 13 to 21.

The adhesive layer 2600 is disposed between the display panel 2400 and the touch screen panel 2500. The adhesive layer 2600 may be configured to block light. In one or more exemplary embodiments, the adhesive layer 2600 may include a black material configured to block light. In this manner, metal wirings (or lines) of the touch screen panel 2500 may not be visually recognized. The adhesive layer 2600 may correspond to the adhesive layer 600 of FIGS. 2-4.

The buffer member 2700 is disposed between the adhesive layer 2600 and the touch screen panel 2500. The buffer member 2700 may include a material having elasticity and may be configured to absorb shock from outside. For example, the buffer member 2700 may prevent damage to the display panel 2400, which is disposed above the buffer member 2700.

The grounding layer 2800 is disposed between the buffer member 2700 and the touch screen panel 2500. The grounding layer 2800 may include a metal material. For example, the grounding layer 2800 may include copper (Cu). The grounding layer 2800 may be formed as a sheet including copper (Cu).

Figure 10:
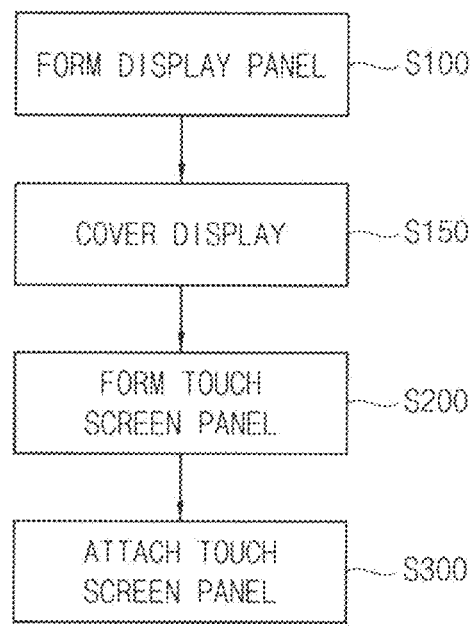
FIG. 10 is a flowchart of a process of manufacturing a touch display device, according to one or more exemplary embodiments.
Figure 11:
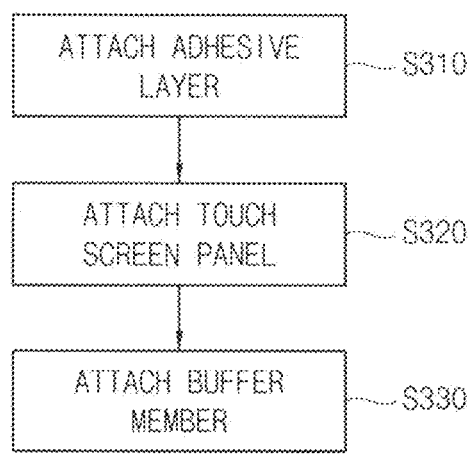
FIG. 11 is a flowchart of a process of manufacturing a touch screen panel, according to one or more exemplary embodiments.

FIGS. 10 and 11 are flowcharts of processes of manufacturing a touch display device, according to one or more exemplary embodiments. For descriptive convenience, the processes of FIGS. 10 and 11 will be described with reference to FIG. 2.

Referring to FIGS. 2, 10, and 11, a display panel 400 may be formed (S100) and covered (S150). A touch screen panel 500 may be formed (S200) and attached to the display panel 400 (S300).

In step S100, after the display panel 400 is formed, the polarizing plate 300 may be attached to the display panel 400. In step S150, the window member 100 may be attached to the polarizing plate 300 to cover the display panel 400. The window member 100 may be attached to the polarizing plate 300 using the optically clear adhesive (OCA) 200. In one or more exemplary embodiments, a single optically clear adhesive (OCA) 200 is disposed between the window member 100 and the display panel 400 to decrease an overall thickness of a touch display device. Step S300 includes attaching the adhesive layer 600 under the display panel 400 (S310), attaching the touch screen panel 500 under the adhesive layer 600 (S320), and attaching the buffer member 700 under the touch screen panel 500 (S330).

Figure 12:
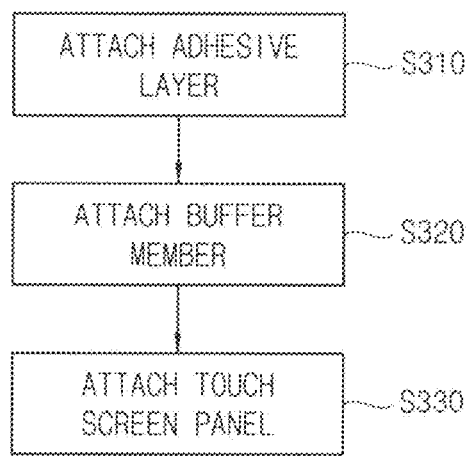
FIG. 12 is a flowchart of a process of manufacturing a touch screen panel, according to one or more exemplary embodiments.

FIG. 12 is a flowchart of a process of manufacturing a touch screen panel, according to one or more exemplary embodiments. For descriptive convenience, FIG. 12 will be described with reference to FIGS. 6 and 10.

Referring to FIGS. 6, 10, and 12, a display panel 1400 may be formed (S100) and covered (S150). A touch screen panel 1500 may be formed (S200) and attached to the display panel 1400 (S300).

In step S100, after the display panel 1400 is formed, the polarizing plate 1300 may be attached to the display panel 1400. In step S150, the window member 1100 may be attached to the polarizing plate 1300 to cover the display panel 1400. The window member 1100 may be attached to the polarizing plate 1300 using the optically clear adhesive (OCA) 1200, which may be a single OCA 1200 to decrease an overall thickness of the touch display device. Step S300 includes attaching the adhesive layer 1600 under the display panel 1400 (S310), attaching the buffer member 1700 under the adhesive layer 1600 (S320), and attaching the touch screen panel 1500 under the buffer member 1700 (S330).

With reference to FIGS. 8, 10, and 12, a method of manufacturing a touch display device, according to one or more exemplary embodiments, includes forming the display panel 2400 (S100), covering the display panel 2400 (S150), forming the touch screen panel 2500 (S200), and attaching the touch screen panel to the display panel 2400 (S300).

In step S100, after the display panel 2400 is formed, the polarizing plate 2300 may be attached to the display panel 2400. In step S150, the window member 2100 may be attached to the polarizing plate 2300 to cover the display panel 2400. The window member 2100 may be attached to the polarizing plate 2300 using the optically clear adhesive (OCA) 2200, which may be a single OCA 2200 to decrease an overall thickness of the touch display device. Step S300 includes attaching the adhesive layer 2600 under the display panel 2400 (S310), attaching the buffer member 2700 under the adhesive layer 2600 (S320), and attaching the touch screen panel 2500 (S330). In one or more exemplary embodiments, before attaching the touch screen panel 2500, the grounding layer 2800 may be attached under the buffer member 2700. After the grounding layer 2800 is attached under the buffer member 2700, the touch screen panel 2500 is attached under the grounding layer 2800.

Figure 13:
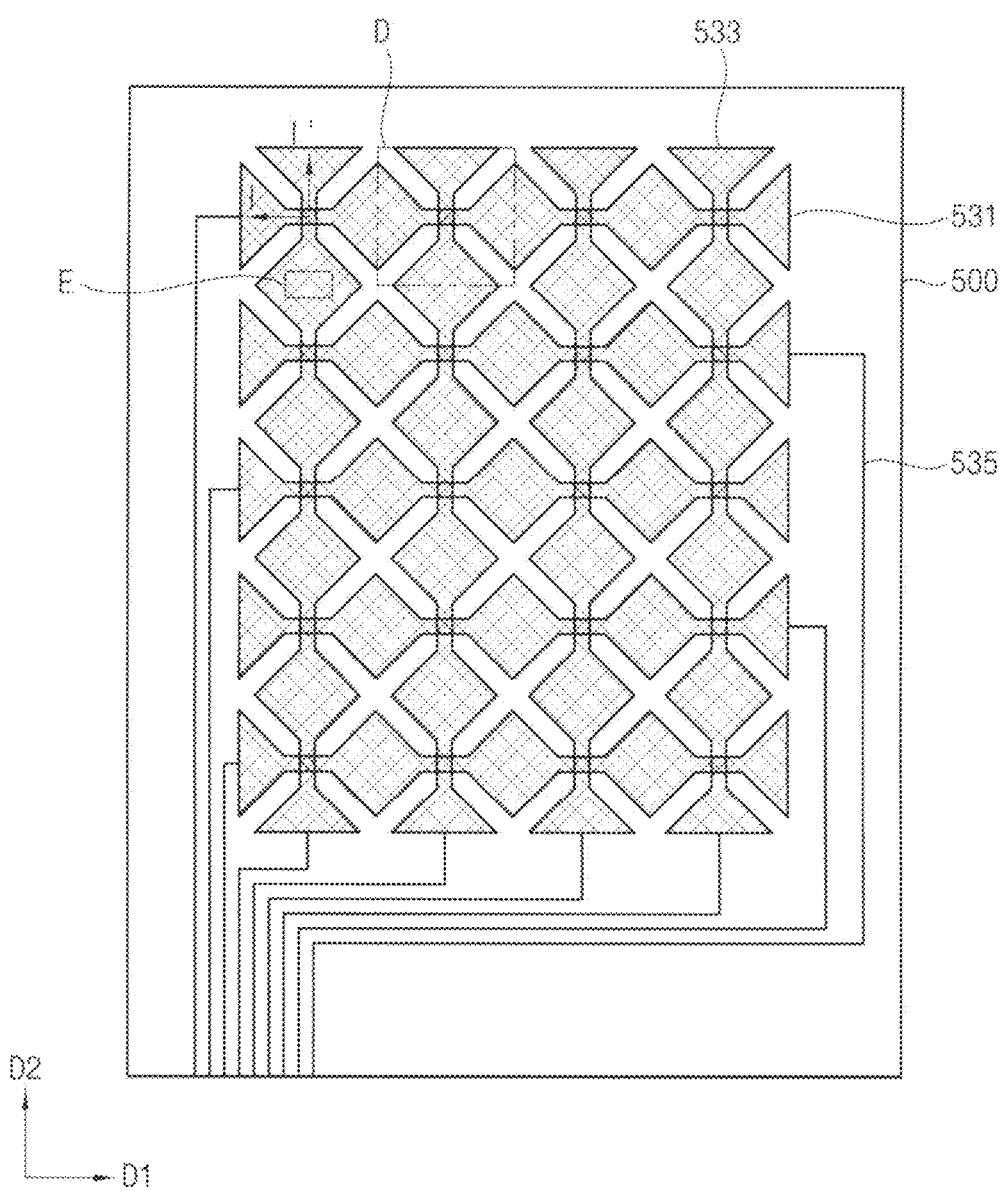
FIG. 13 is a plan view of a touch screen panel, according to one or more exemplary embodiments.
Figure 14:
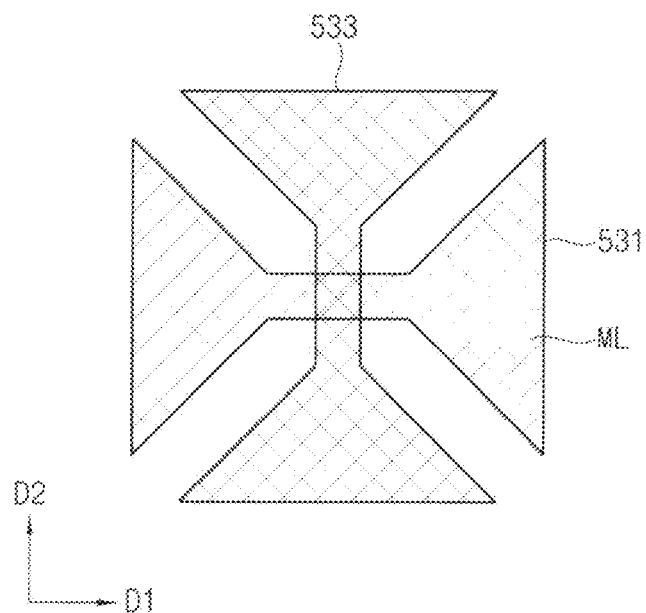
FIG. 14 is an enlarged plan view portion "D" in FIG. 13, according to one or more exemplary embodiments.
Figure 18:
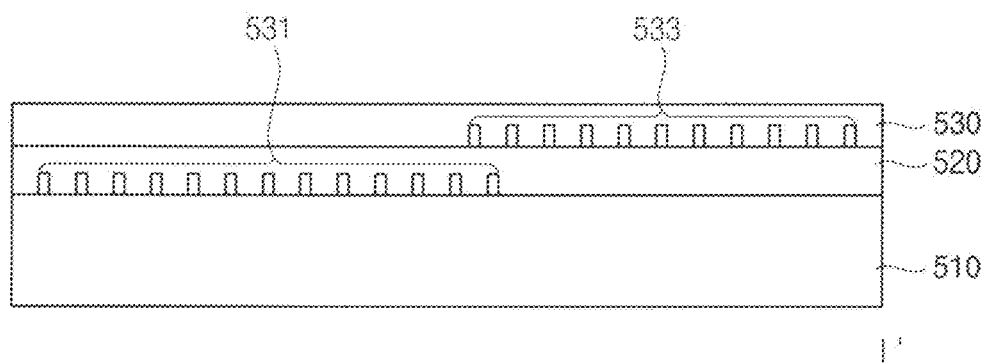
FIG. 18 is a cross-sectional view of the touch screen panel of FIG. 13 taken along sectional line I-I', according to one or more exemplary embodiments.

FIG. 13 is a plan view of a touch screen panel, according to one or more exemplary embodiments. FIG. 14 is an enlarged plan view of portion "D" in FIG. 13, according to one or more exemplary embodiments. FIG. 18 is a cross-sectional view of the touch screen panel of FIG. 13 taken along sectional line I-I', according to one or more exemplary embodiments.

Referring to FIGS. 13, 14, and 18, a touch screen panel 500 includes a base substrate 510, a first insulation layer 520, a second insulation layer 530, a first touch electrode 531, a second touch electrode 533, and a connecting line 535.

The base substrate 510 may be a transparent substrate. The base substrate 510 may be made of a flexible material, such as a material selected from a group consisting of flexible polyethylene terephthalate (PET), polycarbonate (PC), polyethylene (PE), polyvinyl chloride (PVC), polypropylene (PP), polystyrene (PS), and polymethyl methacrylate methyl ester (PMMA). For example, the base substrate 510 may include polycarbonate (PC) and the base substrate 510 may be a circular polarizing film having a λ/4 phase difference. The base substrate 510 may be an upper substrate that constitutes the display panel of a display device. It is also contemplated that the base substrate 510 may be a separate substrate attached to the display panel.

The first touch electrode 531 is disposed on the base substrate 510. The first touch electrode 531 extends in a first direction D1. The first touch electrode 531 may include a plurality of first mesh patterns formed of crossing of metal wires ML. The first mesh patterns may have a rhombus shape in a plan view, however, any suitable polygonal configuration may be utilized in association with exemplary embodiments described herein. The metal wires ML of the first mesh patterns may be formed of a metallic material. The metallic material used for the metal wires ML may include a low-resistance metallic material, such as copper (Cu), aluminum (Al), molybdenum (Mo), titanium (Ti), silver (Ag), gold (Au), nickel (Ni), chromium (Cr), iron (Fe), indium (In), and gallium (Ga), or an alloy including one or more of the aforementioned materials. It is also contemplated that any suitable conductive material may be utilized in association with exemplary embodiments described herein, such as one or more conductive polymer materials.

The first insulation layer 520 is formed on the first touch electrode 531. The first insulation layer 520 may include an inorganic material, such as silicon oxide ($SiO_x$) and/or silicon nitride ($SiN_x$). For example, the first insulation layer 520 includes silicon oxide ($SiO_x$), and may have a thickness of about 500 Å. In one or more exemplary embodiments, the first insulation layer 520 may include a plurality of layers including different materials from each other.

The second touch electrode 533 is disposed on the first insulation layer 520. The second touch electrode 533 extends in a second direction D2 crossing the first direction D1. The second touch electrode 533 may include a plurality of second mesh patterns formed of crossing metal wires ML. The second mesh patterns may have a rhombus shape, however, any other suitable polygonal configuration may be utilized in association with exemplary embodiments described herein. The metal wires ML of the second mesh patterns may be formed of a metallic material. For instance, the metallic material used for the metal wires ML may include a low-resistance metallic material, such as copper (Cu), aluminum (Al), molybdenum (Mo), titanium (Ti), silver (Ag), gold (Au), nickel (Ni), chromium (Cr), iron (Fe), indium (In), and gallium (Ga) or an alloy including one or more of the aforementioned materials. It is also contemplated that any suitable conductive material may be utilized in association with exemplary embodiments described herein, such as one or more conductive polymer materials.

The second insulation layer 530 is formed on the second touch electrode 533. The second insulation layer 530 may include an inorganic material, such as silicon oxide ($SiO_x$) and/or silicon nitride ($SiN_x$). For example, the second insulation layer 530 includes silicon oxide ($SiO_x$), and may have a thickness of about 500 Å. In one or more exemplary embodiments, the second insulation layer 530 may include a plurality of layers including different materials from each other.

The first and second touch electrodes 531 and 533 may be alternately arranged with one another. First touch electrodes arranged in the first direction D1 (e.g., an X coordinate) may be connected to each other, and second touch electrodes arranged in the second direction D2 (e.g., a Y coordinate) may be connected to each other. The touch screen panel 500 may be a capacitive touch screen panel in which the first touch electrode 531 and the second touch electrode 533 are alternately distributed and arranged in the active area.

The first touch electrode 531 and the second touch electrode 533 are connected to connecting lines 535 respectively. The touch screen panel according to an exemplary embodiment is a capacitive touch screen panel. If the touch screen panel is contacted by a contact object, such as a user's finger or stylus pen, a change in capacitance, caused by a contact, is provided to the external driving circuit (not shown) through the connecting lines 535. Then, the change in capacitance is converted into an electrical signal by an X and Y input processing circuit (not shown) or the like, so that the contact position is detected.

The touch screen panel may be divided into a first area and a second area. The connecting lines 535 may be disposed in the first area, and the touch electrodes 531 and 533 may be disposed in the second area. According to one or more exemplary embodiments, the first area may correspond to an active area of the display panel, and the adhesive layer may cover the first area. In this manner, the connecting lines 535 may not be visually recognized and a width of a bezel area of touch display device may be decreased. It is also contemplated that the adhesive layer may cover both the first and second areas.

Figure 15:
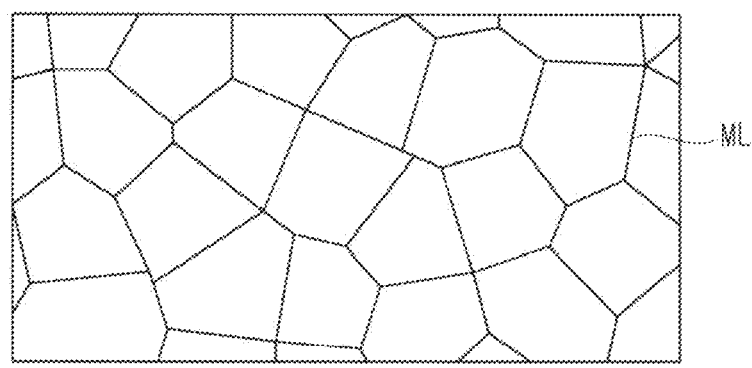
FIG. 15 is an enlarged plan view of portion "E" in FIG. 13, according to one or more exemplary embodiments.
Figure 16:
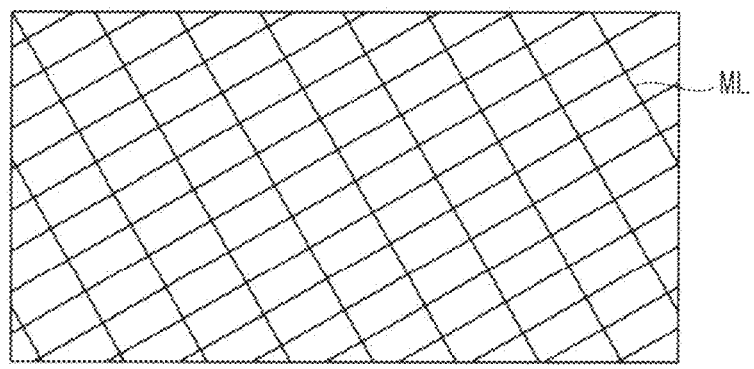
FIG. 16 is an enlarged plan view of portion "E" in FIG. 13, according to one or more exemplary embodiments.
Figure 17:
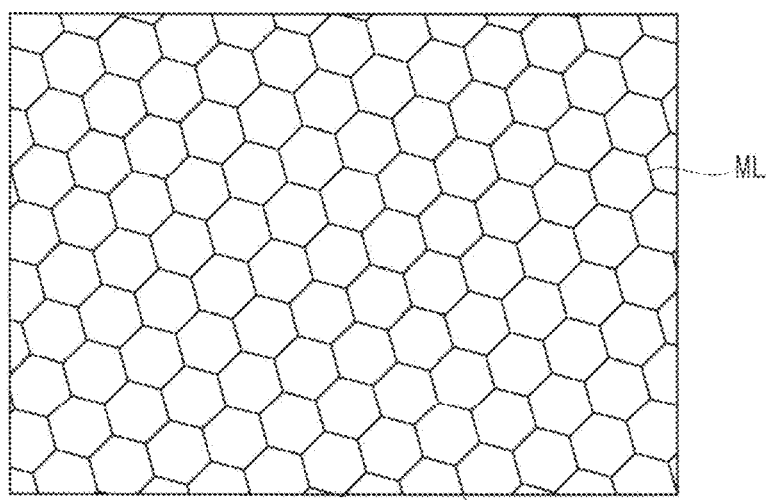
FIG. 17 is an enlarged plan view of portion "E" in FIG. 13, according to one or more exemplary embodiments.

FIGS. 15, 16, and 17 are enlarged plan views of portion "E" in FIG. 13, according to one or more exemplary embodiments.

The mesh pattern in FIG. 15 has an irregular pattern. The manufacturing of the irregular mesh pattern is relatively simple and related processes may be saved, e.g., cost less, require less time, etc. The mesh pattern in FIG. 16 has a rectangular pattern, and the mesh pattern in FIG. 17 has a hexagonal pattern. That is, the mesh patterns in FIGS. 16 and 17 are uniformly arranged in a regular pattern. These regular patterns may cause, at least in part, the transmittance of the touch screen to be more uniform. The surface resistance of the mesh-like pattern may also be distributed more uniformly. Because a deviation in resistance may be relatively small, settings to correct a resistance bias may not be needed to make an image more uniformly displayed. It is contemplated, however, that the mesh pattern may be substantially orthogonal straight line lattice patterns, curved wavy line lattice patterns, etc. The mesh cell of the mesh pattern may be a regular shape, such as triangle, diamond, a regular polygon, etc. It is also contemplated that the mesh cell may be an irregular shape.

Figure 19:
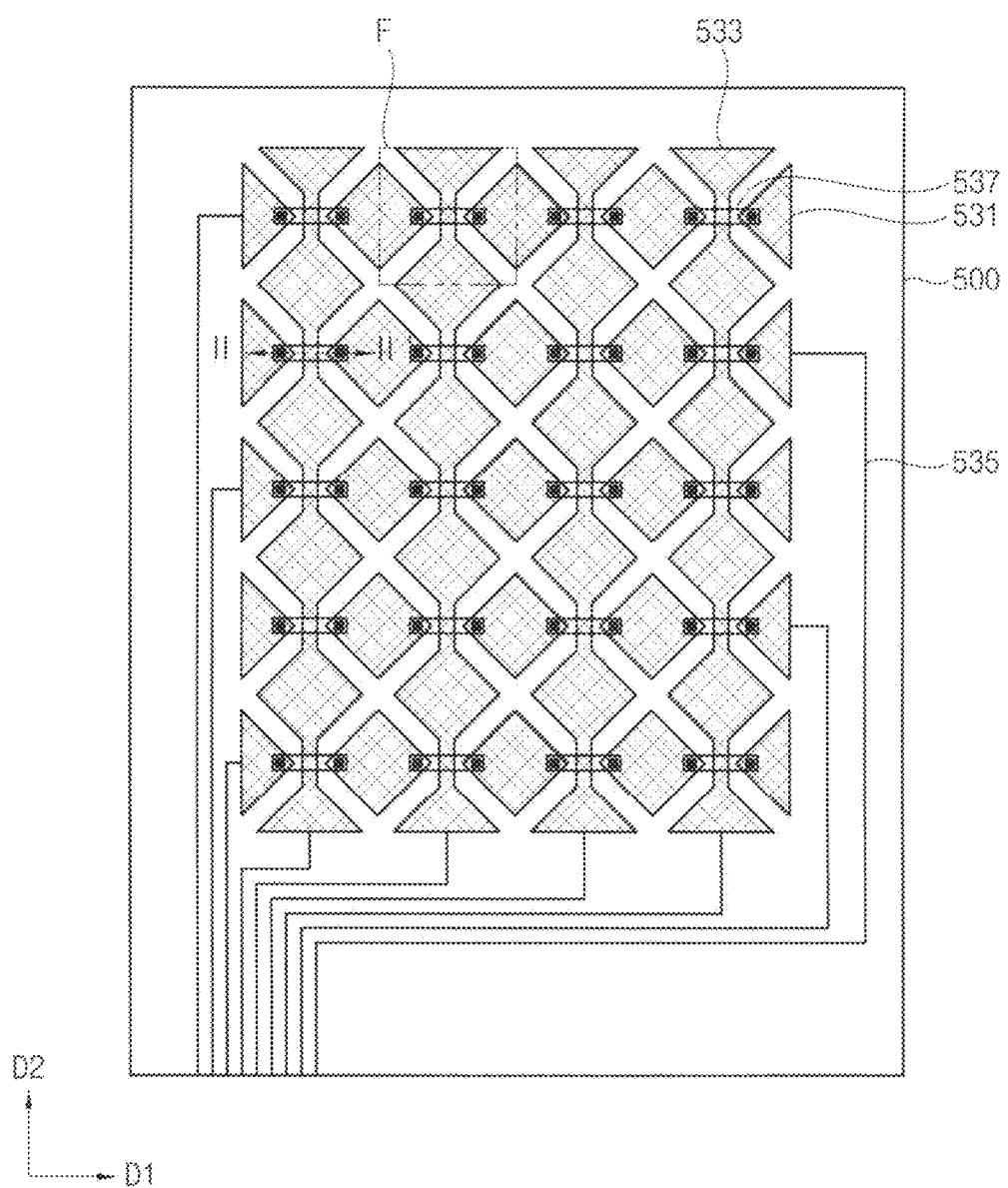
FIG. 19 is a plan view of a touch screen panel, according to one or more exemplary embodiments.
Figure 20:
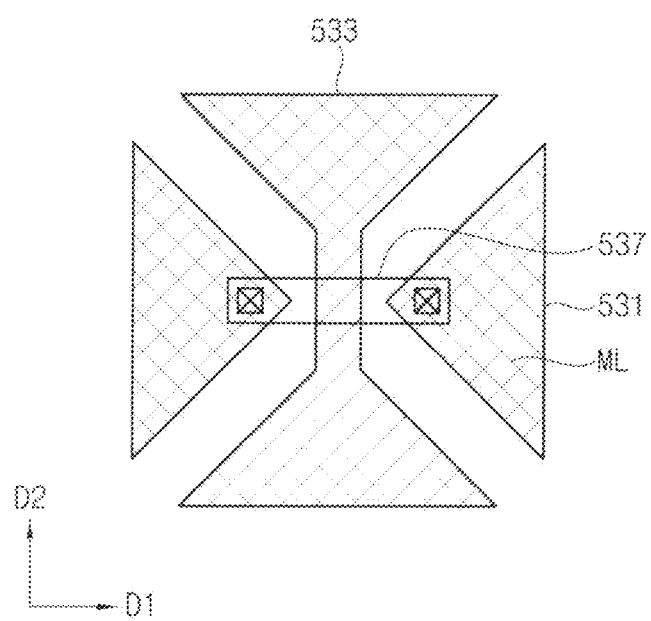
FIG. 20 is an enlarged plan view of portion "F" in FIG. 19, according to one or more exemplary embodiments.
Figure 21:
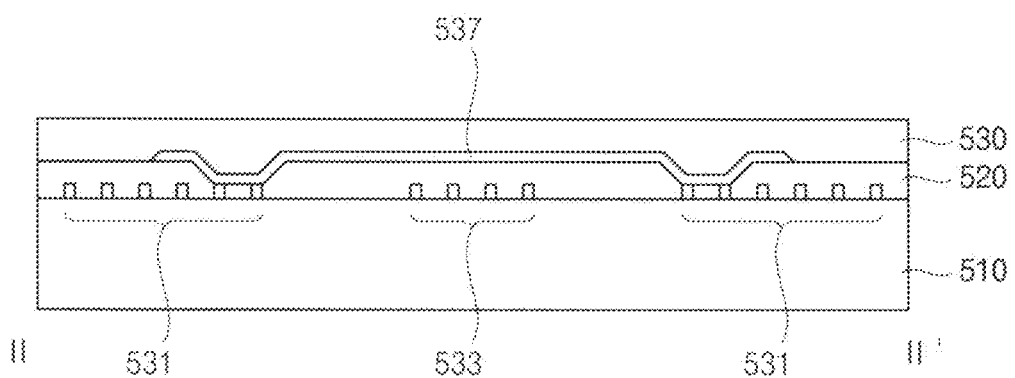
FIG. 21 is a cross-sectional view of the touch screen panel of FIG. 19 taken along the line II-II', according to one or more exemplary embodiments.

FIG. 19 is a plan view of a touch screen panel, according to one or more exemplary embodiments. FIG. 20 is an enlarged plan view of portion "F" in FIG. 19, whereas FIG. 21 is a cross-sectional view of the touch screen panel of FIG. 19 taken along sectional line II-II', according to one or more exemplary embodiments. The touch screen panel of FIGS. 19 to 21 is similar to the touch screen panel of FIGS. 13, 14, and 18. As such, duplicative descriptions have been omitted or reduced to avoid obscuring exemplary embodiments described herein.

Referring to FIGS. 19 to 21, a touch screen panel 500 includes a base substrate 510, a first insulation layer 520, a second insulation layer 530, a first touch electrode 531, a second touch electrode 533, a connecting line 535, and connecting electrode 537.

The first touch electrode 531 and the second touch electrode 533 are disposed on the base substrate 510. The first touch electrode 531 may be disposed on the same layer as the second touch electrode 533. The first touch electrode 531 extends in a first direction D1. The first touch electrode 531 may include a plurality of first mesh patterns formed of crossing metal wires ML. The first mesh patterns may have a rhombus shape, however, any other suitable configuration may be utilized in association with exemplary embodiments. The second touch electrode 533 extends in a second direction D2 crossing the first direction D1. The second touch electrode 533 may include a plurality of second mesh patterns formed of crossing metal wires ML. The second mesh patterns may have a rhombus shape, however, any other suitable configuration may be utilized in association with exemplary embodiments.

The first insulation layer 520 is formed on the first touch electrode 531 and the second touch electrode 533. The first insulation layer 520 may include an inorganic material, such as silicon oxide ($SiO_x$) and/or silicon nitride ($SiN_x$). For example, the first insulation layer 520 includes silicon oxide ($SiO_x$), and may have a thickness of about 500 Å. In one or more exemplary embodiments, the first insulation layer 520 may include a plurality of layers including different materials from each other.

The connecting electrode 537 is disposed on the first insulation layer 520. The connecting electrode 537 electrically connects the spaced apart first mesh patterns, or may connect spaced apart second mesh patterns. The connecting electrode 537 may include a transparent conductive material, such as aluminum zinc oxide (AZO), gallium zinc oxide (GZO), indium tin oxide (ITO), indium zinc oxide (IZO), etc. However, aspects of the connecting electrode 537 are not limited thereto. It is also contemplated that the connecting electrode 537 may include the same material as the first and/or second mesh patterns. In one or more exemplary embodiments, the connecting electrode 537 may include a low-resistance metallic material, such as copper (Cu), aluminum (Al), molybdenum (Mo), titanium (Ti), silver (Ag), gold (Au), nickel (Ni), chromium (Cr), iron (Fe), indium (In), and gallium (Ga), or an alloy including one or more of the aforementioned materials. It is also contemplated that any suitable conductive material may be utilized in association with exemplary embodiments described herein, such as one or more conductive polymer materials.

The second insulation layer 530 is formed on the connecting electrode 537. The second insulation layer 530 may include an inorganic material, such as silicon oxide ($SiO_x$) and/or silicon nitride ($SiN_x$). For example, the second insulation layer 530 includes silicon oxide ($SiO_x$), and may have a thickness of about 500 Å. In addition, the second insulation layer 530 may include a plurality of layers including different materials from each other.

The first and second touch electrodes 531 and 533 may be alternately arranged. First touch electrodes 531 may be arranged in the first direction D1 (e.g., an X coordinate) and may be connected to each other, and second touch electrodes 533 may be arranged in the second direction D2 (e.g., a Y coordinate) and may be connected to each other. The touch screen panel 500 may be a capacitive touch screen panel in which the first touch electrode 531 and the second touch electrode 533 are alternately distributed and arranged in an active area.

The first touch electrode 531 and the second touch electrode 533 are connected to connecting lines 535, respectively. The touch screen panel may be a capacitive touch screen panel. If the touch screen panel is contacted (or almost contacted) by a contact object, such as a finger, stylus, etc., a change in capacitance, caused by the contact, may be provided to an external driving circuit (not shown) through the connecting lines 535. The change in capacitance may be converted into an electrical signal by, for instance, an X and Y input processing circuit (not shown), or the like, so that the contact position is detected.

According to one or more exemplary embodiments, a touch display device includes an adhesive layer disposed between the display panel and the touch screen panel, and the touch screen panel is disposed under the display panel. Since the adhesive layer includes a black material, light may be blocked. Accordingly, connecting lines of the touch screen panel may not be visually recognized. Since the adhesive layer blocks light, the connecting lines of the touch screen panel may be disposed in an active area of the display panel. Accordingly, a width of a bezel area of the touch display device may be decreased. Furthermore, a single optically clear adhesive (OCA) may be disposed between the window member and the display panel, such that an overall thickness of the touch display device may be decreased.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A touch display device comprising:
    a touch screen panel;
    a display panel configured to display an image, the display panel comprising a first curved surface area;
    a window member disposed on the display panel, the window member comprising a second curved surface area disposed in correspondence with the first curved surface area;
    an adhesive layer disposed between the display panel and the touch screen panel, the adhesive layer being configured to blocking light in at least a portion thereof;
    a buffer member comprising an elastic material; and
    a grounding layer comprising a conductive material,
    wherein the display panel is disposed between the window member and the touch screen panel,
    wherein the adhesive layer is disposed between the display panel and the buffer member,
    wherein the buffer member is disposed between the adhesive layer and the touch screen panel, and
    wherein the grounding layer is disposed between the buffer member and the touch screen panel.

2. The touch display device of claim 1, wherein the adhesive layer comprises a black material configured to block light.

3. The touch display device of claim 1, wherein the adhesive layer comprises:
    a base film; and
    a tackifying layer disposed on the base film, the tackifying layer comprising tackifying dots spaced apart from each other.

4. The touch display device of claim 3, wherein the tackifying dots comprise an embossed shape.

5. The touch display device of claim 1, further comprising:
a polarizing plate disposed between the display panel and the window member,
wherein the window member is coupled to the polarizing plate via an optically clear adhesive (OCA).

6. The touch display device of claim 1, wherein the touch screen panel comprises:
a base substrate; and
touch electrodes disposed on the base substrate, the touch electrodes comprising a plurality of mesh patterns comprising crossed metal wires.

7. The touch display device of claim 6, wherein the touch electrodes comprise:
a first touch electrode extending in a first direction; and
a second touch electrode extending in a second direction crossing the first direction.

8. A method of manufacturing a touch display device, the method comprising:
disposing a window member on a display panel configured to display an image, the window member comprising a first curved surface area disposed in correspondence with a second curved surface area of the display panel;
disposing an adhesive layer on the display panel, the adhesive layer being configured to block light in at least a portion thereof;
disposing the display panel on a touch screen panel, the adhesive layer being disposed between the display panel and the touch screen panel;
disposing a buffer member on the touch screen panel; and
disposing a grounding layer on the buffer member,
wherein the display panel is disposed between the window member and the touch screen panel,
wherein the buffer member comprises an elastic material,
wherein the adhesive layer is disposed between the display panel and the buffer member,
wherein the grounding layer comprises a conductive material, and
wherein the grounding layer is disposed between the buffer member and the touch screen panel.

9. The method of claim 8, wherein the adhesive layer comprises a black material configured to block light.

10. The method of claim 8, wherein the adhesive layer comprises:
a base film; and
a tackifying layer disposed on the base film, the tackifying layer comprising tackifying dots spaced apart from each other.

11. The method of claim 10, wherein the tackifying dots comprise an embossed shape.

12. The method of claim 8, further comprising:
disposing a polarizing plate between the display panel and the window member,
wherein the window member is coupled to the polarizing plate using an optically clear adhesive (OCA).

13. The method of claim 8, wherein the touch screen panel comprises:
a base substrate; and
touch electrodes disposed on the base substrate, the touch electrodes comprising a plurality of mesh patterns comprising crossed metal wires.

14. The method of claim 13, wherein the touch electrodes comprise:
a first touch electrode extending in a first direction; and
a second touch electrode extending in a second direction crossing the first direction.

* * * * *